United States Patent
Lampela et al.

(10) Patent No.: US 10,301,460 B2
(45) Date of Patent: May 28, 2019

(54) POLYPROPYLENE WITH ENHANCED VISUAL APPEARANCE

(71) Applicants: ABU DHABI POLYMERS CO. LTD. (BOROUGE) L.L.C., Abu Dhabi (AE); BOREALIS AG, Vienna (AT)

(72) Inventors: Janne Lampela, Abu Dhabi (AE); Geir Johnsen, Abu Dhabi (AE); Yousef Judeh, Abu Dhabi (AE); James Ong, Abu Dhabi (AE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/535,375

(22) PCT Filed: Dec. 21, 2015

(86) PCT No.: PCT/EP2015/080791
§ 371 (c)(1),
(2) Date: Jun. 13, 2017

(87) PCT Pub. No.: WO2016/102465
PCT Pub. Date: Jun. 30, 2016

(65) Prior Publication Data
US 2017/0355839 A1    Dec. 14, 2017

(30) Foreign Application Priority Data

Dec. 22, 2014  (EP) ..................... 14199601

(51) Int. Cl.
*C08L 23/10* (2006.01)
*C08K 5/00* (2006.01)
*C08K 5/098* (2006.01)
*C08K 5/1575* (2006.01)

(52) U.S. Cl.
CPC ............ *C08L 23/10* (2013.01); *C08K 5/0083* (2013.01); *C08K 5/098* (2013.01); *C08K 5/1575* (2013.01); *C08K 5/0041* (2013.01)

(58) Field of Classification Search
CPC ........ C08K 5/098; C08K 5/06; C08K 5/0041; C08K 5/0083; C08L 23/10; C08L 23/12; C08L 23/14; C08L 23/16
USPC ....................................................... 524/394
See application file for complete search history.

(56) References Cited

U.S. PATENT DOCUMENTS

| | | |
|---|---|---|
| 5,234,879 A | 8/1993 | Garoff et al. |
| 2010/0160518 A1* | 6/2010 | Congdon ............. C08K 5/0083 524/396 |
| 2016/0264755 A1* | 9/2016 | Lee ..................... C10M 159/18 |

FOREIGN PATENT DOCUMENTS

| | | | | |
|---|---|---|---|---|
| EP | 0091612 A1 | * | 10/1983 | ............ C08K 5/098 |
| EP | 0091612 A1 | | 10/1983 | |
| EP | 0887379 A1 | | 12/1998 | |
| EP | 2380926 A1 | | 10/2011 | |
| EP | 2719725 A1 | | 4/2014 | |
| JP | 2001-240698 A | * | 9/2001 | ........... C08K 5/1575 |
| JP | 2001-310948 A | | 11/2001 | |
| JP | 2001310948 A | * | 11/2001 | ................ C08J 3/22 |
| JP | 2012-233149 A | | 11/2012 | |
| WO | 92/12182 A1 | | 7/1992 | |
| WO | 92/19653 A1 | | 11/1992 | |
| WO | 92/19658 A1 | | 11/1992 | |
| WO | 99/33843 A1 | | 7/1999 | |
| WO | 2004/029112 A1 | | 4/2004 | |
| WO | WO-2014136842 A1 | * | 9/2014 | ............ C08K 5/098 |
| WO | 2014/136842 A1 | | 12/2014 | |

OTHER PUBLICATIONS

JP 2001-240698 A (Fujii et al.) Apr. 9, 2001, machine translation.*
D. Biglavi, et al., Polypropylene Handbook, 2005, pp. 361-380.
V. Busico, et al., "Full Assignment of the 13C NMR Spectra of Regioregular Polypropylenes: Methyl and Methylene Region", Macromolecules 1997, pp. 6251-6263.
V. Busico, et al., "Microstructure of polypropylene", Prog. Polym. Sci. 26, (2001), pp. 443-533.
V. Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.
H. N. Cheng, "13C NMR ANalysis of Ethylene Propylene Rubbers", Macromolecules 1984, pp. 1950-1955.
L. Resconi, et al., "Selectivity in Propene Polymerization with Metallocene Catalysts", Chem. Rev. 2000, pp. 1253-1345.
Z. Zhou, et al., "A new decoupling method for accurate quantification of polyethylene copolymer composition and triad sequence distribution with 13C NMR", Journal of Magnetic Resonance 187, (2007), pp. 225-233.
H. Zweifel, "Plastics Additives Handbook", 5th edition, 2001.
W.H. Wang, et al., "Structural Analysis of Ethylene/Propylene Copolymers Synthesized with a Constrained Geometry Catalyst", Macromolecules 2000, pp. 1157-1162.
European Search Report for Application No. 14199601.7-1306, dated Mar. 6, 2015.
P. Galli, et al., "High Yield Catalysts in Olefin Polymerization", Die Angewandte Makromolekulare Chemie 120, (1984), pp. 73-90.
Office action for Japanese Patent Application No. 2017-533596, dated Apr. 17, 2018.
Office action for Korean Patent Application No. 10-2017-7018326, dated Oct. 22, 2018.

* cited by examiner

*Primary Examiner* — Rip A Lee
(74) *Attorney, Agent, or Firm* — Tarolli, Sundheim, Covell & Tummino LLP

(57) ABSTRACT

Polymer composition comprising a polypropylene, a nucleating agent being a sorbitol derivative and zinc stearate.

10 Claims, No Drawings

POLYPROPYLENE WITH ENHANCED VISUAL APPEARANCE

The present invention is directed to a polymer composition with enhanced visual appearance and to an article comprising the inventive polymer composition as well as to the preparation of said article. Furthermore, the present invention is directed to the use of a zinc fatty acid salt in a polymer composition for reducing the haze of an article that is formed from said polymer composition.

BACKGROUND OF THE INVENTION

Polymers such as polypropylene are vastly applied in end-use products, including automotive applications, packaging applications, house ware applications, storage applications, and the like. There is a general need for an improved visual appearance of clarified polymers with reduced haze and low yellowness.

The use of nucleating agents to reduce the haze in articles prepared from polypropylene compositions is known in the art. Nucleating agents provide nucleation sites for polymer crystal growth during molding or fabrication processes. Compositions comprising nucleating agents typically crystallize at higher crystallization temperatures and at faster rates compared to compositions without nucleating agents.

The efficiency of a nucleating agent is typically measured by the peak crystallization temperature of the polymer compositions. A high polymer peak crystallization temperature is indicative of high nucleation efficacy, which usually translates into faster nucleation rates and thus shorter processing cycle times.

Generally, the presence of many nucleation sites associated with adding a nucleating agent results in a larger number of smaller crystals. As a result of the smaller crystals formed therein, clarification of articles prepared from the polymer may also be achieved, although excellent clarity is not always the result. For applications that require excellent clarity of the polymer article, an additive that induces low haze within the final product is added to the polymer composition. Such compounds are generally called clarifying agents or clarifiers.

A combination of high nucleation efficacy and high article clarity is desirable. An effective clarifying agent known in the state of the art are acetals of sorbitols, such as dibenzylidene sorbitol acetal derivatives. However, acetals of sorbitols exhibit a poor solubility in polypropylene compositions and process temperatures of more than 220° C. are required to dissolve sufficient amounts. Furthermore, the presence of other additives required to adjust the properties of the polypropylene composition according to need influence the efficiency of the clarifying agent and the performance of the other additives.

It is an object of the present invention to provide a polypropylene composition with excellent visual appearance allowing to prepare articles from such polypropylene compositions with equally good to excellent visual appearance.

It has been surprisingly found that the addition of zinc fatty acid salt results in a polymer composition comprising polypropylene with excellent visual appearance suitable for the preparation of articles that also show this favorable visual appearance.

BRIEF DESCRIPTION OF THE INVENTION

The invention is directed at a polymer composition, comprising (i) polypropylene (PP),
(ii) first nucleating agent (NU1) having the structure,

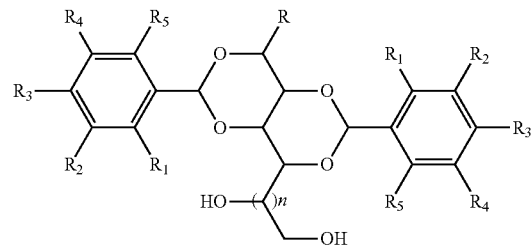

wherein R is independently selected from the group consisting of hydrogen, alkyl, alkenyl, alkynyl, alkoxy, aryloxy, hydroxyalkyl, alkyl halide cycloalkyl, cycloalkenyl, aryl, substituted aryl, and combinations thereof, wherein $R_1$ to $R_5$ are independently selected from the group consisting of hydrogen, alkyl, alkenyl, alkynyl, alkoxy, aryloxy, hydroxyalkyl, cycloalkyl, cycloalkenyl, aryl, substituted aryl, halide, amino and thioether and combinations thereof, and optionally any adjacent $R_1$ to $R_5$ are linked together to form a 5-membered or 6-membered ring, and wherein n is an integer from 0 to 2, preferably an integer from 1 to 2, more preferably n is 1, and (iii) zinc fatty acid salt.

Preferably the zinc fatty acid salt is zinc stearate.

In a preferred embodiment the polymer composition does not contain calcium stearate, more preferably does not contain calcium fatty acid salts, still more does not contain earth alkali fatty acid salts. In a still more preferred embodiment the zinc fatty acid salt, like the zinc stearte, is the only fatty acid salt within the polymer composition.

The polymer composition may comprise in addition a second nucleating agent (NU2) and/or an optical brightener (OB).

Accordingly it is preferred that the polymer composition of this invention comprises (i) the polypropylene (PP) in an amount of more than 95.0 wt.-%, based on the weight of the polymer composition,
(ii) the first nucleating agent (NU1) in an amount of equal or below 0.5 wt.-%, based on the weight of the polymer composition,
(iii) the zinc fatty acid salt, like the zinc stearate, optionally together with earth alkali fatty acid salts in an amount below 0.5 wt.-%, based on the weight of the polymer composition,
(iv) optionally the second nucleating agent (NU2) in an amount of equal or below 1.0 wt.-%, based on the weight of the polymer composition, and
(v) optionally the optical brightener (OB) in an amount of equal or below 0.100 wt.-%, based on the weight of the polymer composition.

Preferably the polypropylene (PP) is a propylene copolymer preferably comprising equal or below 5 wt.-% comonomer, wherein preferably the comonomer is selected from ethylene and/or one or more $C_4$-$C_8$ α-olefins, more preferably selected from ethylene and/or 1-butene, yet more preferably is ethylene.

It is especially preferred that the polypropylene (PP), like the propylene copolymer, is monophasic. Thus it is especially preferred that the polypropylene (PP) is a random propylene copolymer.

The nucleating agent (NU) is preferably selected from the group consisting of 1,3:2,4 bis(dibenzylidene)sorbitol, 1,3:2,4 bis(4-methylbenzylidene)sorbitol, 1,3:2,4 bis(4-ethylbenzylidene)sorbitol, 1,3:2,4 bis(3,4-dimethylbenzylidene)sorbitol, and 1,3:2,4 bis(3-chloro-benzylidene)sorbitol.

It is especially preferred that the zinc fatty acid salt, like the zinc stearate, is present in amount of from 0.008 to 0.150 wt.-%, preferably from 0.010 to 0.100 wt.-%, more preferably from 0.03 to 0.07 wt.-%, and even more preferably from 0.040 to 0.060 wt.-%, based on the weight of the polymer composition.

The optical brightener (OB) is preferably selected from the group consisting of 5-methyl-2,2'-(vinylenedi-p-phenylene)bis-benzoxazole, 2,2'-(4,4'-diphenol vinyl)dibenzoxazole, 2,5-bis(5-tert-butylbenzooxazol-2-yl)thiophene, 1,4-bis(2-benzoxazolyl)napthalene, 2-(5-Chlorobenzo[d]oxazol-2-yl)acetonitrile.

Preferably the polymer composition according to this invention is obtained from melt-blending, more preferably from melt blending at a temperature in the range of 110 to 140° C., the polypropylene (PP) with the first nucleating agent (NU1), the zinc fatty acid salt, like zinc stearate, optionally the earth alkali fatty acid salts, optionally the second nucleating agent (NU2) and optionally optical brightener (OB).

In a preferred embodiment, the polymer composition according to this invention has a haze in the range from 20 to 40%, preferably 25 to 35%, wherein the haze is measured according to ASTM D 1003-07 on 60×60 mm$^2$ plaques thickness of 2 mm prepared according to EN ISO 1873-2 at a processing temperature of the plaques of 190° C., and/or a yellowness index in the range of −20 to 15, preferably from −15 to 5 as determined according to ASTM E313.

Additionally the invention is directed to a molded article comprising the polymer composition as defined herein. Preferably said molded article is an injection molded article or blow molded article, preferably a sequential injection molding article, a co-injection-gas assisted molding article, a structural foam molding article, an extrusion blow molding article, an injection blow molding article and/or an injection stretch molding article.

Preferably said article has a thickness from 0.3 to 5.0 mm, preferably from 0.4 to 3.5 mm, more preferably from 0.5 to 2.0 mm.

Additionally the invention is directed to a process for preparing a molded article as defined herein, wherein the process comprises the steps of
providing a polymer composition as defined herein,
processing said polymer composition to form the article, wherein the processing temperature is not higher than 250° C., preferably not higher than 230° C., more preferably not higher than 220° C., still more preferably not higher than 210° C., yet more preferably not higher than 200° C., still yet more preferably not higher than 195° C., like not higher than 190° C.

Preferably the processing step is an injection molding step and/or a blow molding step, more preferably a thin walled injection molding step, a sequential injection molding step, a co-injection-gas assisted molding step, a structural foam molding step, an extrusion blow molding step, an injection blow molding step and/or an injection stretch molding step.

Finally the invention is also directed to the use of a zinc fatty acid salt, preferably zinc stearate, as a component in a polymer composition as defined above and in more detail below wherein, wherein said polymer composition is used for preparing an article, preferably a molded article, like an injection molded article, having reduced haze relative to the same article prepared in the absence of said zinc fatty acid salt, preferably in the absence of said zinc stearate, wherein haze is measured according to ASTM D 1003-07 on 60×60 mm$^2$ plaques having thickness of 2 mm prepared according to EN ISO 1873-2 at a processing temperature of the plaques of 190° C.

Further the invention is directed to the use of a zinc fatty acid salt, preferably zinc stearate, in a process as defined above and in more detail below to form an article having reduced haze relative to the same article formed in the absence of said zinc fatty acid salt, preferably in the absence of said zinc stearate wherein haze is measured according to ASTM D 1003-07 on 60×60 mm$^2$ plaques having thickness of 2 mm prepared according to EN ISO 1873-2 at a processing temperature of the plaques of 190° C.

Preferably in both cases the haze is reduced by at least 5%, preferably by at least 10%, more preferably by at least 15%, even more preferably by at least 25%, and most preferably by at least 35%.

DETAILED DESCRIPTION OF THE INVENTION

The Polypropylene (PP)

The polymer composition according to the present invention comprises polypropylene (PP) as an essential component.

The type of polypropylene is not restricted to a specific one and can be prepared by means within the skill in the art, for example, using single site catalysts or Ziegler-Natta catalysts. The propylene and optionally ethylene and/or α-olefins are polymerized under conditions within the skill in the art, for instance as disclosed by Galli, et al., Angew. Macromol. Chem., Vol. 120, 73 (1984), or by Nello Pasquini (Ed.), et al. in Polypropylene Handbook, Carl Hanser Verlag, Munich, 2005, particularly pages 359 to 380, the disclosures of which are incorporated herein by reference.

The polypropylene (PP) can be a heterophasic polypropylene or a monophasic polypropylene. The term "heterophasic polypropylene" denotes a polypropylene with a multiphase structure comprising a crystalline matrix phase in which an elastomeric phase is dispersed, i.e. polypropylene with at least two glass transition temperatures, and the term "monophasic polypropylene" denotes a polypropylene with no multiphase structure, i.e. a polypropylene with just one glass transition temperature. Furthermore, it is appreciated that the polypropylene (PP) can be a propylene homopolymer or a propylene copolymer. The term "propylene homopolymer" denotes a polymer consisting essentially of propylene monomer units. However, due to the requirements of large-scale polymerization it may be possible that the propylene homopolymer includes minor amounts of comonomer units, which usually are below 0.1 wt.-%, preferably below 0.05 wt.-%, most preferably below 0.01 wt.-% of the polypropylene. In a specific embodiment no comonomers are detectable in a propylene homopolymer.

The polypropylene (PP) according to the present invention has a melt flow rate MFR$_2$ (230° C., 2.16 kg) measured according to ISO 1133 of less than 100 g/10 min, preferably less than 50 g/10 min, more preferably less than 40 g/10 min, even more preferably less than 35 g/10 min, like in the range of 1 to 200 g/10 min, preferably in the range of 10 to 100 g/10 min, more preferably in the range of 15 to 45 g/10 min, even more preferably in the range of 20 to 40 g/10 min, and most preferred in the range of 25 to 35 g/10 min.

The polypropylene (PP) can be a propylene copolymer, in particular a propylene copolymer with a comonomer content equal or below 5.0 wt.-%, preferably equal or below 4.0 wt.-%, more preferably equal or below 3.5 wt.-%, such as in the range of 1.0 to 5.0 wt.-%, preferably in the range of 2.0 to 4.0 wt.-%, more preferably in the range of 3.0 to 4.0 wt.-%, even more preferably in the range of 3.0 to 3.5, based on the weight of the polypropylene (PP).

The propylene copolymer typically comprises one comonomer only, but the use of two or more comonomers is also envisaged. The comonomer is preferably selected from ethylene and/or one or more $C_4$-$C_8$ α-olefins, more preferably from ethylene and/or 1-butene, even more preferably the comonomer is ethylene.

The propylene copolymer (PP) can be a random propylene copolymer (R-PP). The term "random propylene copolymer" denotes a copolymer of propylene monomer units and comonomer units, in which the comonomer units are randomly distributed in the polymeric chain. Thus, a random copolymer is different from a heterophasic copolymer comprising a matrix phase and an elastomeric phase dispersed therein, as described above. Accordingly, the random propylene copolymer (R-PP) does not contain an elastomeric polymer phase dispersed therein, i.e. has just one glass transition temperature. However, the random propylene copolymer (R-PP) can be the matrix phase of a heterophasic propylene copolymer.

The random propylene copolymer (R-PP) has a melt flow rate $MFR_2$ (230° C., 2.16 kg) measured according to ISO 1133 of less than 100 g/10 min, preferably less than 50 g/10 min, more preferably less than 40 g/10 min, even more preferably less than 35 g/10 min, like in the range of 1 to 200 g/10 min, preferably in the range of 10 to 100 g/10 min, more preferably in the range of 15 to 50 g/10 min, even more preferably in the range of 20 to 40 g/10 min, and most preferred in the range of 25 to 35 g/10 min.

The random propylene copolymer (R-PP) has a comonomer content, preferably an ethylene content, equal or below 5.0 wt.-%, preferably equal or below 4.0 wt.-%, more preferably equal or below 3.5 wt.-%, such as in the range of 1.0 to 5.0 wt.-%, preferably in the range of 2.0 to 4.0 wt.-%, more preferably in the range of 3.0 to 4.0 wt.-%, yet even more preferably in the range of 3.0 to 3.5, based on the weight of the random propylene copolymer (R-PP).

The random propylene copolymer (R-PP) has a comonomer selected from ethylene and/or one or more $C_4$-$C_8$ α-olefins, more preferably selected from ethylene and/or 1-butene. According to a preferred embodiment the polypropylene (PP) is a random propylene ethylene copolymer (R-PP) with ethylene as the only comonomer.

The polypropylene (PP) to be used in accordance with the present invention may be prepared by polymerizing, in a slurry reactor, for example a loop reactor, propylene monomers, optionally together with one or more comonomers, in the presence of a polymerization catalyst to produce the polypropylene (PP) or part of it. In the latter case this part is then transferred to a subsequent gas phase reactor, wherein in the gas phase reactor propylene monomers are reacted, optionally in the presence of suitably selected comonomers in order to produce a further part of the polypropylene (PP) in the presence of the reaction product of the first step. This reaction sequence provides a reactor blend of parts (i) and (ii) constituting the polypropylene (PP). It is of course possible that the first reaction is carried out in a gas phase reactor while the second polymerization reaction is carried out in a slurry reactor, for example a loop reactor. The polymerization steps may be adjusted, for example by appropriately selecting monomer feed, comonomer feed, hydrogen feed, temperature and pressure in order to suitably adjust the properties of the polymerization products obtained. Such a process can be carried out using any suitable catalyst for the preparation of propylene monomers, including single site catalysts or Ziegler-Natta catalysts.

Preferably, the process is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658, WO 99/33843 and WO 2004/029112A1, incorporated herein by reference. Preferred external donors are the known silane-based donors, such as dicyclopentyl dimethoxy silane or cyclohexyl methyldimethoxy silane.

One embodiment of a process as discussed above is a loop-gas phase process, such as developed by *Borealis*, known as Borstar technology, described for example in EP 0887379 A1 and WO 92/12182, incorporated herein by reference.

With respect to the above-mentioned preferred slurry-gas phase process, the following general information can be provided with respect to the process conditions.

Temperature of from 40° C. to 110° C., preferably between 60° C. and 100° C., in particular between 80° C. and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50° C. to 130° C., more preferably 80° C. to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

In a preferred embodiment, the polymer composition does not comprise (a) further polymer(s) besides the polypropylene (PP) and optionally the second nucleating agent (NU2), in an amount exceeding in total 10 wt.-%, preferably exceeding in total 5 wt.-%, based on the total weight of the polymer composition. Typically if an additional polymer is present, such a polymer is a carrier polymer for additives and thus does not contribute to the improved properties of the polymer composition.

Accordingly in one specific embodiment the polymer composition consists of polypropylene (PP), first nucleating agent (NU1), the zinc fatty acid salt, like the zinc stearate, optionally earth alkali fatty acid salts, like the calcium fatty acid salt, e.g. the calcium stearate, optionally second nucleating agent (NU2), optionally optical brightener (OB) and additional additives, which might contain in low amounts of polymeric carrier material. However this polymeric carrier material is not more than 10 wt.-%, preferably not more than 5 wt.-%, present in the polymer composition, based on the total weight of polymer composition. Moreover this polymeric carrier material is different to the polypropylene (PP) and the second nucleating agent (NU2). In a specific embodiment, if polymeric carrier material is present, said polymeric carrier material is an ethylene homopolymer and/or a propylene homopolymer, the latter being preferred.

According to another embodiment the polypropylene (PP) is the only polymer present in the polymer composition.

It should be noted that the polypropylene (PP) employed according to the present application may be commercially available, so that it is not necessary to first manufacture a polypropylene in order to execute the present invention.

The Nucleating Agent (NU)

The polypropylene composition according to the present invention comprises a first nucleating agent (NU1) as an essential component and optionally a second nucleating agent (NU2) different to the first nucleating agent (NU1).

The term "nucleating agent" denotes a compound or composition which is added to increase the crystallization rate of a polymer resulting in an increased degree of crystallinity and usually a smaller crystal size. According to this invention the nucleating agent is an alpha nucleating agent.

The first nucleating agent (NU1) has the structure,

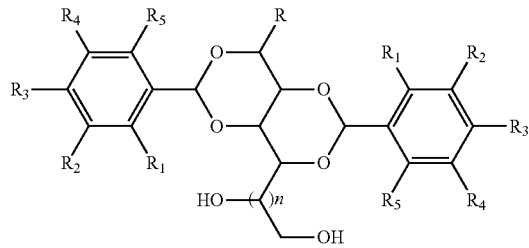

wherein R is independently selected from the group consisting of hydrogen, alkyl, alkenyl, alkynyl, alkoxy, aryloxy, hydroxyalkyl, alkyl halide cycloalkyl, cycloalkenyl, aryl, substituted aryl, and combinations thereof, and wherein $R_1$ to $R_5$ are independently selected from the group consisting of hydrogen, alkyl, alkenyl, alkynyl, alkoxy, aryloxy, hydroxyalkyl, cycloalkyl, cycloalkenyl, aryl, substituted aryl, halide, amino and thioether and combinations thereof, and optionally any adjacent $R_1$ to $R_5$ are linked together to form a 5-membered or 6-membered ring, and wherein n is an integer from 0 to 2, preferably an integer from 1 to 2, more preferably n is 1.

Preferably, R is selected from the group consisting of hydrogen, methyl, ethyl, iso-propyl, n-butyl, sec-butyl, iso-butyl and tert-butyl, and $R_1$ to $R_5$ are independently selected from the group consisting of hydrogen, chlorine, methyl, ethyl, n-propyl, iso-propyl, n-butyl, sec-butyl, iso-butyl and tert-butyl, and n is 1.

Still more preferably, R is hydrogen and $R_1$ to $R_5$ are independently selected from the group consisting of hydrogen, chlorine, methyl, ethyl, n-propyl, iso-propyl, n-butyl, sec-butyl, iso-butyl and tert-butyl, and n is 1.

Yet more preferably, R is hydrogen and $R_1$ to $R_5$ are independently selected from the group consisting of hydrogen, chlorine, methyl, ethyl, and tert-butyl, and n is 1.

It should be noted that although only the 1,3:2,4 isomer is represented, this structure is provided for convenience and illustration only and the invention is not limited to only isomers of the 1,3:2,4 type, but includes any other isomers, such as the 3,5:4,6 type or the 2,4:3,5 type.

Even more preferably the first nucleating agent (NU1) is selected from the group consisting of 1,3:2,4 bis(dibenzylidene)sorbitol, 1,3:2,4 bis(4-methylbenzylidene)sorbitol, 1,3:2,4 bis(4-ethylbenzylidene)sorbitol, 1,3:2,4 bis(3,4-dimethylbenzylidene)sorbitol, and 1,3:2,4 bis(3-chloro-benzylidene) sorbitol.

Yet even more preferably the first nucleating agent (NU1) is 1,3:2,4 bis(3,4-dimethylbenzylidene)sorbitol.

The polymer composition preferably comprises the first nucleating agent (NU1) in an amount of equal or below 0.500 wt.-%, preferably equal or below 0.300 wt.-%, more preferably equal or below 0.250 wt.-%, like in the range of 0.0001 to 0.5000 wt.-%, preferably in the range of 0.0001 to 0.3000 wt.-%, more preferably in the range of 0.0100 to 0.3000 wt.-%, even more preferably 0.1000 to 0.2500 wt.-%, based on the weight of the polymer composition.

The polypropylene composition may comprise a second nucleating agent (NU2) different to the first nucleating agent (NU1). Typical examples of nucleating agents that can be applied as the second nucleating agent (NU2) are salts of monocarboxylic acids and polycarboxylic acids, for example sodium benzoate, phosphorous-based compounds, for instance mono-, bis- or tetraphenyl phosphates, for example sodium 2,2'-methylene bis-(4,6-di-tert-butylphenyl) phosphate or hydroxybis (2,4,8,10-tetra-tert-butyl-6-hydroxy-12H-dibenzo(d,g)(1,3,2) dioxaphosphocin 6-oxidato) aluminium, or any mixtures, as well as polymeric nucleating agent.

It is preferred that the second nucleating agent (NU2) is a polymeric nucleating agent, more preferably a polymer of vinyl compound, in particular a polymeric nucleating agent obtainable by polymerising vinylcycloalkane monomers or vinylalkane monomers.

The polymeric nucleating agent is preferably a polymerized vinyl compound according to the following formula

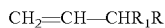

wherein $R_1$ and $R_2$ together form a 5- or 6-membered saturated, unsaturated or aromatic ring, optionally containing substituents, or independently represent an alkyl group comprising 1 to 4 carbon atoms, whereby in case $R_1$ and $R_2$ form an aromatic ring, the hydrogen atom of the —$CHR_1R_2$ moiety is not present.

Even more preferably, the polymeric nucleating agent is selected from vinyl cycloalkane polymer, in particular vinyl cyclohexane (VCH) polymer, vinyl cyclopentane polymer, 3-methyl-1-butene polymer and vinyl-2-methyl cyclohexane polymer. The most preferred polymeric nucleating agent applied as the second nucleating agent (NU2) is vinyl cyclohexane (VCH) polymer.

The amount of the second nucleating agent (NU2) present in the polymer composition is equal or below 1.0 wt.-%, more preferably equal or below 0.5 wt.-%, even more preferably equal or below 0.3 wt.-%, yet even more preferably equal or below 0.2 wt.-%, like in the range of 0.00001 to 1.00000 wt.-%, preferably in the range of 0.00001 to 0.50000 wt.-%, more preferably in the range of 0.00001 to 0.30000 wt.-%, even more preferably in the range of 0.00001 to 0.10000 wt.-%, yet even more preferably in the range of 0.00010 to 0.05000 wt.-%, based on the weight of the polymer composition.

Accordingly in one preferred embodiment the polymer composition comprises a vinylcyclohexane (VCH) polymer as the second nucleating agent (NU2) in an amount of equal or below 1.0 wt.-%, more preferably equal or below 0.5 wt.-%, even more preferably equal or below 0.3 wt.-%, yet even more preferably equal or below 0.2 wt.-%, like in the range of 0.00001 to 1.00000 wt.-%, preferably in the range of 0.00001 to 0.50000 wt.-%, more preferably in the range of 0.00001 to 0.30000 wt.-%, even more preferably in the range of 0.00001 to 0.10000 wt.-%, yet even more preferably in the range of 0.00010 to 0.05000 wt.-%, based on the weight of the polymer composition.

The first nucleating agent (NU1) and the second nucleating agent (NU2) respectively may be introduced to the polymer composition during the polymerisation process of the polypropylene (PP) or at a later stage, for example by a post polymerization processes, including admixing first nucleating agent (NU1) and the second nucleating agent (NU2) respectively, using the master batch technology.

It is preferred that the second nucleating agent (NU2) being a polymeric nucleating agent, like vinyl cyclohexane (VCH) polymer, is introduced to the polymer compositing during the polymerisation process of the polypropylene (PP). The second nucleating agent (NU2) is preferably introduced to the polypropylene (PP), by first polymerising the above defined vinyl compound, even more preferably vinyl cyclohexane (VCH), in the presence of a catalyst system comprising a solid catalyst component, preferably a solid Ziegler Natta catalyst component, a cocatalyst and optional external donor, and the obtained reaction mixture of the polymer of the vinyl compound as defined above, even more preferably vinyl cyclohexane (VCH) polymer, and the catalyst system is then used for producing the polypropylene (PP).

It is appreciated that the polypropylene (PP) and optionally the second nucleating agent (NU2), preferably a polymeric nucleating agent defined above, are the only polymers present in the polymer composition.

The polypropylene composition may comprise additional nucleating agents such as talc, alongside the first nucleating agent (NU1) and optionally the second nucleating agent (NU2). However, according to a preferred embodiment the first nucleating agent (NU1) and the second nucleating agent (NU2) are the only nucleating agents present in the polymer composition. According to another preferred embodiment the first nucleating agent (NU1) is the only nucleating agent present in the polymer composition.

The Zinc Fatty Acid Salt and Optional Earth Alkali Fatty Acid Salts

The polypropylene composition according to the present invention must comprises a zinc fatty acid salt as an essential component.

As indicated above acetals of sorbitol exhibit a poor solubility in polypropylene and process temperatures of more than 220° C. are required to dissolve sufficient amounts. It has surprisingly been found that by using zinc fatty acid salt, like zinc stearate, in the polymer composition according to the present invention, the dissolution properties of sorbitol acetals, i.e. of the first nucleating agent (NU1), in polypropylene (PP) can be significantly improved. In particular, it has surprisingly been found that by including zinc fatty acid salt, like zinc stearate, in a specific amount the process temperatures required to dissolve a sufficient amount of sorbitol acetals, i.e. of the first nucleating agent (NU1), in the polypropylene (PP) can significantly be reduced, thus, resulting in improved process efficiency while the visual appearance of the polymer composition as well as the articles prepared therefrom is markedly improved.

Accordingly the inventive polymer composition must include zinc fatty acid salt(s), like zinc sterate. The inventive polymer composition may comprise in addition to the zinc fatty acid salt(s), like the zinc sterate, also earth alkali fatty acid salts. In other words the polymer composition may also comprise a mixture of different (earth alkali) fatty acid salts with the proviso that zinc fatty acid salt, like zinc sterate, is present in polymer composition.

Preferably the zinc fatty acid salt is a zinc salt of a $C_{12}$ to $C_{26}$ fatty acid, more preferably a zinc salt of a $C_{14}$ to $C_{24}$ fatty acid, even more preferably a zinc salt of a $C_{18}$ to $C_{22}$ fatty acid, yet more preferably a zinc sal of a $C_{18}$ fatty acid, e.g. zinc stearate. Furthermore, it is appreciated that the zinc fatty acid salt is a zinc salt of a saturated fatty acid, in particular of a non-branched saturated fatty acid, as defined in this paragraph.

Preferably the earth alkali fatty acid salts (in addition to the zinc fatty acid salt)—if present in the polymer composition—are earth alkali salts of a $C_{12}$ to $C_{26}$ fatty acid, more preferably earth alkali salts of a $C_{14}$ to $C_{24}$ fatty acid, even more preferably earth alkali salts of a $C_{18}$ to $C_{22}$ fatty acid, yet more preferably earth alkali salts of a $C_{18}$ fatty acid, e.g. of stearic acid. The cation of these earth alkali fatty acid salts is preferably selected from calcium and/or magnesium, preferably is calcium. Furthermore, it is appreciated that the earth alkali fatty acid is an earth alkali fatty acid of a saturated fatty acid, in particular of a non-branched saturated fatty acid, as defined in this paragraph.

Accordingly in one embodiment the polymer composition comprises a mixture of a zinc fatty acid salt as defined above, like zinc stearate, and at least one earth alkali fatty acid salt as defined above. It is in particular preferred that the polymer composition comprises a zinc fatty acid salt as defined above, like zinc stearate, and calcium fatty acid salt, like calcium stearate. Still more prefereably the polymer composition comprises a zinc fatty acid salt, like zinc stearate, and calcium fatty acid salt, like calcium stearate, as the only earth alkali fatty acid salts, like as the only fatty acid salts.

In one specific embodiment the polymer composition comprises the zinc fatty acid salt as defined above, like zinc stearate, as the only earth alkali fatty acid salt, like as the only fatty acid salt.

The total amount of zinc fatty acid salt as defined above, like zinc stearate, and optional earth alkali fatty acid salts, like calcium fatty acid salt, e.g. calcium stearate, together in the polymer composition is of equal or less than 0.5 wt.-% (like equal or less 0.5000 wt.-%, preferably of equal or less than 0.2 wt.-% (like equal or less 0.2000 wt.-%), more preferably of equal or less than 0.1 wt.-% (like equal or less 0.1100 wt.-%), even more preferably in an amount of equal or less than 0.05 wt.-% (like equal or less 0.0500 wt.-%), like in the range of 0.001 to 0.150 wt.-%, preferably in the range of 0.005 to 0.100 wt.-%, more preferably in the range of from 0.008 to 0.07 wt.-%, even more preferably in the range of 0.01 to 0.06 wt.-%, and most preferred in the range of 0.04 to 0.06 wt.-%, based on the weight of the polymer composition.

Preferably the weight ratio between the zinc fatty acid salt as defined above, like zinc stearate, and the earth alkali fatty acid salts, like calcium fatty acid salt, e.g. calcium stearate, is 20/80 to 80/20, more preferably 30/70 to 70/30, yet more preferably 40/60 to 60/40, like 45/55 to 55/45.

Preferably the total amount of the zinc fatty acid salt, like zinc stearate, in the polymer composition is from 0.008 to 0.150 wt.-%, more preferably from 0.010 to 0.100 wt.-%, yet more preferably from 0.03 to 0.07 wt.-%, and even more preferably from 0.040 to 0.060 wt.-%.

The zinc fatty acid salt, like the zinc stearate, and the optional earth alkali fatty acid salt(s) can be introduced during the polymerisation process of the polypropylene (PP). However, it is preferred to introduce them into the polymer composition at a later stage, for example by a post polymerization processes, including admixing the zinc fatty acid salt, like the zinc stearate, and the optional earth alkali fatty acid salt(s) preferably by using dry blends or the master batch technology. It is also possible to introduce the zinc fatty acid salt, like the zinc stearate, and the optional earth alkali fatty acid salt(s) to the polymer composition together with the first nucleating agent (NU1) in form of dry blends or a master batch.

The Optical Brightener (OB)

The tendency of many polymers to yellow is a result of degradation. The breakdown products absorb blue light, giving a yellow appearance in daylight. Optical brighteners are colorless or slightly colored organic compounds that are designed to brighten colors or mask yellowing in lacquers, paints, inks, polymers and fibers. They work via a fluorescent mechanism, absorbing light in the ultraviolet and violet region of the electromagnetic spectrum and emitting it in the blue range of the visible spectrum, resulting in a brighter, fresher appearance.

The term "optical brightener" denotes organic small molecules of 20-100 atoms comprising a conjugated $\pi$-system of aromatic groups, or plane or cyclic molecules with several $\pi$ bonds and optionally at least one heteroatom selected from the group consisting of oxygen, nitrogen, sulfur, phosphor and selenium, preferably selected from oxygen, nitrogen and sulfur.

The optical brightener (OB) is a organic small molecule of 20-100 atoms comprising a conjugated $\pi$-system of aromatic groups, or plane or cyclic groups with several $\pi$ bonds, with at least on moiety selected from the group consisting of triazine-stilbene, coumarin, imidazoline, diazole, triazole, benzoxazoline, biphenyl-stilbene and oxazole, preferably with at least on moiety selected from the group consisting of oxazole and/or benzoxazole.

According to an embodiment the optical brightener (OB) is selected from the group consisting of ethoxylated 1,2-(benzimidazolyl)ethylene, 2-styrylnaphth[1,2d]-oxazole, 1,2-bis(5' methyl-2-benzoxazolyl)ethylene, 4,4'-bis[4"-bis(2"-hydroxymethyl)amino-6"(3"-sulphophenyl)amino-1", 3",5"-triazin-2"-yl amino]-2,2'-stilbenedisulphonate, 4-methyl-7-dimethyl aminocoumarin, alkoxylated 4,4'-bis-(benzimidazolyl)stilbene, 2-(5-chlorobenzo[d]oxazol-2-yl)acetonitrile, 2,2'-(4,4'-diphenolvinyl)dibenzoxazol, 1,4-bis-benzoxazolyl-naphthalene, 1,4-bis(2-benzoxazolyl)napthalene, 5-methyl-2,2'-(vinylenedi-p-phenylene)bisbenzoxazole, 2,2'-(1,2-ethenediyldi-4,1-phenylene)bisbenzoxazole and/or 2,5-bis(5-tert-butylbenzooxazol-2-yl)thiophene.

According to another embodiment the optical brightener (OB) is selected from the group consisting of 2-(5-chlorobenzo[d]oxazol-2-yl)acetonitrile, 2,2'-(4,4'-diphenol vinyl)dibenzoxazol, 1,4-bis(2-benzoxazolyl)napthalene, 5-methyl-2,2'-(vinylenedi-p-phenylene)bisbenzoxazole, 2,2'-(1,2-ethenediyldi-4,1-phenylene)bisbenzoxazole and/or 2,5-bis(5-tert-butylbenzooxazol-2-yl)thiophene.

According to a preferred embodiment the optical brightener (OB) is 2,5-bis(5-tert-butylbenzooxazol-2-yl)thiophene.

The polymer composition may comprise the optical brightener (OB) in an amount of equal or below 0.100 wt.-%, preferably in an amount of equal or below 0.010 wt.-%, more preferably in an amount of equal or below 0.0050 wt.-%, even more preferably in an amount of equal or below 0.0010, like in the range of 0.0001 to 0.1000 wt.-%, preferably in the range of 0.0001 to 0.0100 wt.-%, more preferably in the range of 0.0001 to 0.0050 wt.-%, even more preferably in the range of 0.0001 to 0.0015 wt.-%, yet even more preferably in the range of 0.0003 to 0.0010 wt.-%, based on the weight of the polymer composition.

The optical brightener (OB) can be introduced during the polymerisation process of the polypropylene (PP). However, it is preferred to introduce the optical brightener (OB) at a later stage, for example by a post polymerization processes, including admixing the optical brightener (OB) preferably using the master batch technology.

The Polymer Composition

The polymer composition comprises polypropylene (PP), first nucleating agent (NU1), zinc fatty acid salt, like the zinc stearate, optionally earth alkali fatty acid salt(s), optionally second nucleating agent (NU2), and optionally optical brightener (OB), as described above or below. In a preferred embodiment the polymer consists of polypropylene (PP), first nucleating agent (NU1), zinc fatty acid salt, like zinc stearate, optionally earth alkali fatty acid salt(s), optionally second nucleating agent (NU2), optionally optical brightener (OB), and optionally additives as described above or below.

The polymer composition may comprise polypropylene (PP) in an amount of at least 95.0 wt.-%, preferably in an amount of at least 98.0 wt.-%, more preferably in an amount of at least 99.0 wt.-%, like in the range of 95.0 to 99.8 wt.-%, preferably in the range of 98.0 to 99.8 wt.-%, even more preferably in the range of 98.5 wt.-% to 99.8, based on the weight of the polymer composition.

The polymer composition comprises the first nucleating agent (NU1) in an amount of equal or below 0.5 wt.-%, preferably in an amount of equal or below 0.3 wt.-%, more preferably in an amount of equal or below 0.2 wt.-%, like in the range of 0.0001 to 0.5000 wt.-%, preferably in the range of 0.0001 to 0.3000 wt.-%, more preferably in the range of 0.0100 to 0.3000 wt.-%, even more preferably in the range of 0.1000 to 0.3000 wt.-%, based on the weight of the polymer composition.

The polymer composition may comprise the second nucleating agent (NU2) in an amount of equal or below 1.0 wt.-%, more preferably in an amount of equal or below 0.5 wt.-%, even more preferably in an amount of equal or below 0.3 wt.-%, yet even more preferably in an amount of equal or below 0.2 wt.-%, like in the range of 0.00001 to 1.00000 wt.-%, preferably in the range of 0.00001 to 0.50000 wt.-%, more preferably in the range of 0.00001 to 0.30000 wt.-%, even more preferably in the range of 0.00001 to 0.10000 wt.-%, yet even more preferably in the range of 0.00010 to 0.05000 wt.-%, based on the weight of the polymer composition.

The polymer composition may comprise the zinc fatty acid salt, like the zinc stearate, in an amount of from 0.008 to 0.150 wt.-%, more preferably from 0.010 to 0.100 wt.-%, yet more preferably from 0.03 to 0.07 wt.-%, and even more preferably from 0.040 to 0.060 wt.-%, based on the weight of the polymer composition.

The polymer composition may comprise the earth alkali fatty acid salts, like calcium fatty acid salt, e.g. calcium stearate, in an amount of from 0.008 to 0.150 wt.-%, more preferably from 0.010 to 0.100 wt.-%, yet more preferably from 0.03 to 0.07 wt.-%, and even more preferably from 0.040 to 0.060 wt.-%, based on the weight of the polymer composition.

Thus the total amount of zinc fatty acid salt as defined above, like zinc stearate, and optional earth alkali fatty acid salts, like calcium fatty acid salt, e.g. calcium stearate, together in the polymer composition is of equal or less than 0.5 wt.-% (like equal or less 0.5000 wt.-%), preferably of equal or less than 0.2 wt.-% (like equal or less 0.2000 wt.-%), more preferably of equal or less than 0.1 wt.-% (like equal or less 0.1100 wt.-%), even more preferably in an amount of equal or less than 0.05 wt.-% (like equal or less 0.0500 wt.-%), like in the range of 0.001 to 0.150 wt.-%, preferably in the range of 0.005 to 0.100 wt.-%, more preferably in the range of from 0.008 to 0.07 wt.-%, even more preferably in the range of 0.01 to 0.06 wt.-%, and most preferred in the range of 0.04 to 0.06 wt.-%, based on the weight of the polymer composition.

The polymer composition may comprise the optical brightener (OB) in an amount of equal or below 0.100 wt.-%, preferably in an amount of equal or below 0.010 wt.-%, more preferably in an amount of equal or below 0.0050 wt.-%, even more preferably in an amount of equal or below 0.0010, like in the range of 0.0001 to 0.1000 wt.-%, preferably in the range of 0.0001 to 0.0100 wt.-%, more preferably in the range of 0.0001 to 0.0050 wt.-%, even more preferably in the range of 0.0001 to 0.0015 wt.-%, yet even more preferably in the range of 0.0003 to 0.0010 wt.-%, based on the weight of the polymer composition.

Moreover, the propylene composition of the invention may contain further additives different to those defined above. The further additives different to those defined above are preferably selected from the group of modifiers and stabilizers such as stabilizers, antistatic agents, lubricants, pigments and combinations thereof. Specifically, such additives include primary antioxidants like sterically hindered phenols and secondary antioxidants like phosphites, UV stabilizers like sterically hindered amines, acid scavengers, carbon black, pigment, antistatic agents like glycerol monostearate, slip agents like oleamide. Such additives are generally commercially available and are described, for example, in "Plastic Additives Handbook", 5th edition, 2001 of Hans Zweifel.

The total amount of optional further additives different to the first nucleating agent (NU1), the second nucleating agent (NU2), the zinc fatty acid salt as defined above, like the zinc stearate, the earth alkali fatty acid salts, like calcium fatty acid salt, e.g. calcium stearate, and the optical brightener (OB) is preferably between 0.0001 and 10.0000 wt.-%, preferably 0.0001 and 5.0000 wt.-%, preferably 0.0001 and 2.5000 wt.-%, more preferably between 0.0001 and 1.5000 wt.-%, still more preferably between 0.0001 and 1.0000 wt.-%, based on the weight of the polymer composition.

It is especially preferred that polymer composition consists of polypropylene (PP), first nucleating agent (NU1), the zinc fatty acid salt as defined above, like the zinc stearate, optionally earth alkali fatty acid salts, like the calcium fatty acid salt, e.g. the calcium stearate, optionally optical brightener (OB), optionally second nucleating agent (NU2) and optionally further additives, all as defined above.

A further characteristic of the polymer composition is the melting behavior. Accordingly it is appreciated that the polymer composition has a melting temperature ($T_m$) measured by differential scanning calorimetry (DSC) of at least 130.0° C., more preferably of at least 150° C., even more preferably of at least 151° C., like in the range of 130 to 200° C., preferably in the range of 140 to 170° C., even more preferably in the range of 150 to 155° C.

Further it is appreciated that the polymer composition has crystallization temperature (Tc) measured by differential scanning calorimetry (DSC) of at least 100° C., more preferably of at least 105° C. Accordingly the polymer composition has preferably a crystallization temperature (TO measured by differential scanning calorimetry (DSC) in the range of 100 to 130° C., more preferably in the range of 105 to 125° C., even more preferably in the range of 115 to 121° C.

The inventive polymer composition exhibits an excellent visual appearance. In particular the inventive polymer composition exhibits a low haze value. Accordingly the polymer composition according to this invention has a haze in the range from 20 to 40%, preferably 25 to 35%, more preferably in the range of 20 to 30%, wherein the haze is measured according to ASTM D 1003-07 on 60×60 mm² plaques thickness of 2 mm prepared according to EN ISO 1873-2 at a processing temperature of the plaques of 190° C. A haze value in the range of 20 to 30%, like 22 to 28%, is in particular achieved in case the zinc fatty acid salt, like zinc stearate, is alone present, i.e. no other (earth alkali) fatty acid salts are present in the polymer composition.

Additionally it is preferred that the polymer composition according to this invention has yellowness index in the range of −20 to 15, preferably from −15 to 5 as determined according to ASTM E313 preferably on 60×60 mm² plaques thickness of 2 mm prepared according to EN ISO 1873-2 at a processing temperature of the plaques of 190° C.

Furthermore, the inventive polymer composition can be processed with improved efficiency. In particular the inventive polymer composition can be processed at reduced processing temperatures.

A crucial factor in this respect is the addition of specific nucleating agents in combination with specific fatty acid salts. It has surprisingly been found that the visual appearance and the processing efficiency of a polymer composition comprising polypropylene can be improved when the first nucleating agent (NU1) is present in combination with zinc fatty acid salt, like zinc stearate, in particular when the first nucleating agent (NU1) and the zinc fatty acid salt, like zinc stearate, are present in a specific ratio to each other.

In a preferred embodiment the first nucleating agent (NU1) and the zinc fatty acid salt, like the zinc stearate, fulfill together the inequation (Ia), preferably inequation (Ib), more preferably inequation (Ic), even more preferably inequation (Id), still yet more preferably inequation (Ie)

$$\frac{W(NU1)}{W(EAF)} \leq 100 \tag{Ia}$$

$$100 \geq \frac{W(NU1)}{W(EAF)} \geq 0.5 \tag{Ib}$$

$$30 \geq \frac{W(NU1)}{W(EAF)} \geq 1.0 \tag{Ic}$$

$$25 \geq \frac{W(NU1)}{W(EAF)} \geq 1.5 \tag{Id}$$

$$20 \geq \frac{W(NU1)}{W(EAF)} \geq 2.0 \tag{Ie}$$

wherein "W (NU1)" is the weight [wt.-%] of the first nucleating agent (NU1), based on the weight of the polymer composition and "W (EAF)" is the weight [wt.-%] of the zinc fatty acid salt, like the zinc stearate, based on the weight of the polymer composition.

The polymer composition can be prepared by melt blending, the polypropylene (PP), the first nucleating agent (NU1), the zinc fatty acid salt as defined above, like the zinc stearate, optionally the earth alkali fatty acid salts, like the calcium fatty acid salt, e.g. the calcium stearate, optionally the second nucleating agent (NU2), optionally the optical brightener (OB) and optionally further additives, all as defined above and below.

The melt blending is preferably accomplished at temperatures at which the first nucleating agent (NU1) dissolves in the polypropylene (PP), i.e. typically at temperatures between 210 to 240° C., like between 220 to 230° C.

For melt blending the individual components of the polymer composition, a conventional compounding or blending apparatus, e.g. a Banbury mixer, a 2-roll rubber mill, Buss-cokneader or a twin screw extruder may be used. Preferably, mixing is accomplished in a corotating twin screw extruder. The polymer composition recovered from the extruder is then preferably further processed, to generate an article as defined below.

The polymer composition can be in particular prepared by feeding the polypropylene (PP), the first nucleating agent (NU1), the zinc fatty acid salt as defined above, like the zinc stearate, optionally earth alkali fatty acid salts, like the calcium fatty acid salt, e.g. the calcium stearate, optionally the second nucleating agent (NU2), optionally the optical brightener (OB) and optionally further additives, all as defined above and below, from different hoppers into the melt blending apparatus (e.g. the extruder). However, it is also possible to feed more than one compound from a single hopper.

According to an embodiment the first nucleating agent (NU1), the zinc fatty acid salt as defined above, like the zinc stearate, optionally earth alkali fatty acid salts, like the calcium fatty acid salt, e.g. the calcium stearate, optionally the second nucleating agent (NU2), optionally the optical brightener (OB) and optionally further additives, all as defined above and below, are blended forming a pre-blend and the pre-blend is subsequently melt blended with the polypropylene (PP), as defined above and below, forming the polymer composition.

The polymer composition is obtained by a process as defined above and below, wherein the polypropylene (PP) is melt blended, with a pre-blend comprising first nucleating agent (NU1), the zinc fatty acid salt as defined above, like the zinc stearate, optionally earth alkali fatty acid salts, like the calcium fatty acid salt, e.g. the calcium stearate, optionally second nucleating agent (NU2), optionally optical brightener (OB) and optionally further additives, all as defined above and below Accordingly, the present invention is also directed to a polymer composition which is obtained from melt blending a polypropylene (PP) with a pre-blend comprising the first nucleating agent (NU1) as defined herein, the zinc fatty acid salt as defined above, like the zinc stearate, optionally earth alkali fatty acid salts, like the calcium fatty acid salt, e.g. the calcium stearate, optionally the second nucleating agent (NU2) and optionally optical brightener (OB).

According to an embodiment the pre-blend consists of the first nucleating agent (NU1) the zinc fatty acid salt as defined above, like the zinc stearate, optionally earth alkali fatty acid salts, like the calcium fatty acid salt, e.g. the calcium stearate, optionally the second nucleating agent (NU2), optionally the optical brightener (OB) and optionally the further additives. According to another embodiment the pre-blend consists of the first nucleating agent (NU1) and the zinc fatty acid salt as defined above, like the zinc stearate.

It is appreciated that the first nucleating agent (NU1) and the zinc fatty acid salt as defined above, like the zinc stearate, together with the optional earth alkali fatty acid salts, like the calcium fatty acid salt, e.g. the calcium stearate, in the pre-blend fulfill together the inequation (IIa), preferably inequation (IIb), $$\frac{W(NU1)}{W(EAF)} \leq 500 \qquad (IIa)$$

$$500 \geq \frac{W(NU1)}{W(EAF)} \geq 0.0001 \qquad (IIb)$$

wherein "W (NU1)" is the weight [wt.-%] of the first nucleating agent (NU1), based on the total weight of the first nucleating agent (NU1), the zinc fatty acid salt as defined above, like the zinc stearate, and the optional earth alkali fatty acid salts, like the calcium fatty acid salt, e.g. the calcium stearate, and "W (EAF)" is the weight [wt.-%] of the zinc fatty acid salt as defined above, like the zinc stearate, together with the optional earth alkali fatty acid salts, like the calcium fatty acid salt, e.g. the calcium stearate, based on the total weight of the first nucleating agent (NU1), the zinc fatty acid salt as defined above, like the zinc stearate, and the optional earth alkali fatty acid salts, like the calcium fatty acid salt, e.g. the calcium stearate.

The polymer composition according to the present invention has the advantage, particularly when the polypropylene (PP) is blended with a pre-blend, that the dispersion of the compounds is increased, thereby further improving the transparency and the processability at low process temperatures.

The Molded Article

According to another aspect the invention is directed to an article comprising the inventive polymer composition, wherein the article preferably is a molded article. The amount of the polymer composition in the article, like the molded article, is at least 70 wt.-%, more preferably at least 90 wt.-%, even more preferably at least 95 wt.-%, yet even more preferably at least 99 wt.-%. According to a preferred embodiment the article, preferably the molded article, consists of the polymer composition.

In another preferred embodiment, the article does not comprise (a) further polymer(s) different to the polymers present in the polymer composition, i.e. different to the polypropylene (PP) and optionally the second nucleating agent (NU2), in an amount exceeding in total 10 wt.-%, preferably exceeding in total 5 wt.-%, based on the total weight of the article. Typically if an additional polymer is present, such a polymer is a carrier polymer for additives and thus does not contribute to the improved properties of the article. Accordingly in one specific embodiment the article, consists of the polymer composition as defined herein and additional additives, which might contain in low amounts of polymeric carrier material. However this polymeric carrier material is present in the article in amounts of not more than 10 wt.-%, preferably not more than 5 wt.-%, based on the total weight of the article. Moreover, this polymeric carrier material is different to the polypropylene (PP) and the second nucleating agent (NU2), which are the polymer components of the polymer composition. In a specific embodiment, if polymeric carrier material is present, said polymeric carrier material is an ethylene homopolymer and/or a propylene homopolymer different to the polypropylene (PP) and the second nucleating agent (NU2). In one particular preferred embodiment the article consists only of the polymer composition as defined herein.

The articles comprising polymer composition according to the invention may be produced by any common conversion process suitable for thermoplastic polymers, especially preferred are molding processes, such as injection molding processes or blow molding processes.

It is therefore preferred that the article is a molded article, more preferably an injection molded or blow molded article, such as a thin walled injection molding article, a sequential injection molding article, a co-injection-gas assisted molding article, a structural foam molding article, an extrusion blow molding article, an injection blow molding article or an injection stretch molding article, in particular an injection molded article.

The article according to the present invention can have a broad range of thicknesses. Due to the use and the presence of the combination of the first nucleating agent 1 (NU1) and the zinc fatty acid salt, like the zinc stearate, as defined herein in the polymer composition according to the present invention, thin articles as well as rather unusually thick articles can be prepared from the polymer composition with excellent visual appearance e.g. in terms of haze and yellowness index.

The article is preferably applied in packaging applications, such as packaging for adhesives, packaging for cosmetics, packaging for pharmaceuticals and the like, automotive applications, such as side trims, step assists, body panels, spoilers, dashboards, interior trims and the like, medical applications such as such as syringes, catheters, needle hubs, needle protectors, inhalers, filter housings, blood collection systems and the like and house ware applications such as plastic containers, detergent cartons, cup and plate boards for oven or microwave use and the like.

In an embodiment the article is a thin-wall article, preferably a thin-wall article with a wall thickness of equal or below 5.0 mm, preferably of equal or below 3.0 mm, more preferably of equal or below 1.5 mm, even more preferably of equal or below 1.0 mm, like in the range of 0.3 to 5.0 mm, preferably in the range of 0.4 to 3.5 mm, more preferably in the range of 0.5 to 2.5 mm, even more preferably in the range of 0.6 to 1.5 mm.

It is appreciated that the article is a thin-wall house ware article such as a thin-wall plastic container, a thin-wall detergent carton, a thin-wall cup and plate, a thin-wall board for oven or microwave use and the like. In particular it is appreciated that the article is a thin-wall house ware article such as a thin-wall plastic container, a thin-wall detergent carton, a thin-wall cup and plate, a thin-wall board for oven or microwave use and the like, with a wall thickness of equal or below 5.0 mm, preferably of equal or below 3.0 mm, more preferably of equal or below 1.5 mm, even more preferably of equal or below 1.0 mm, like in the range of 0.3 to 5.0 mm, preferably in the range of 0.4 to 3.0 mm, more preferably in the range of 0.5 to 1.5 mm, even more preferably in the range of 0.6 to 1.0 mm.

The present invention provides the specific advantage that such articles may be produced at lower processing temperatures due to the combination of the first nucleating agent (NU1) and the zinc fatty acid salt, like the zinc stearate, in particular due to the combination of specific amounts of the first nucleating agent (NU1) and specific amounts of the zinc fatty acid salt, like the zinc stearate.

Accordingly the molded article according to this invention is produced by a process comprises the steps of
providing a polymer composition as defined above
processing said polymer composition to form the article,
wherein the processing temperature is not higher than 250° C., preferably not higher than 230° C., more preferably not higher than 220° C., still more preferably not higher than 210° C., yet more preferably not higher than 200° C., like not higher than 195° C., and most preferably not higher than 190° C.

The preferred processing temperature is in the range of 170 to 230° C., more preferably in the range of 180 to 220° C., yet more preferably in the range of 185 to 210° C., like in the range of 185 to 205° C. or in the range of 185 to 195° C.

Preferably the processing step is an injection molding step and/or a blow molding step, preferably a thin walled injection molding step, a sequential injection molding step, a co-injection-gas assisted molding step, a structural foam molding step, an extrusion blow molding step, an injection blow molding step and/or an injection stretch molding step.

Accordingly, the present invention is also directed to the inventive article that can be obtained by a process comprising a molding step, in particular an injection molding step or a blow molding step, such as a thin walled injection molding step, a sequential injection molding step, a co-injection-gas assisted molding step, a structural foam molding step, an extrusion blow molding step, an injection blow molding step or an injection stretch molding step. Preferably, the article is produced at processing temperatures below 250° C., preferably below 230° C., more preferably below 220° C., still more preferably not higher than 210° C., yet more preferably not higher than 200° C., like not higher than 195° C., and most preferably not higher than 190° C.

The Use

According to another aspect the present invention is directed to the use of a zinc fatty acid salt, preferably zinc stearate, as a component in a polymer composition as defined above, wherein said polymer composition is used for preparing a molded article, like an injection molded article as defined above, having reduced haze relative to the same article prepared in the absence of said zinc fatty acid salt, preferably in the absence of said zinc stearate, wherein haze is measured according to ASTM D 1003-07 on 60×60 mm² plaques having thickness of 2 mm prepared according to EN ISO 1873-2 at a processing temperature of the plaques of 190° C. Preferably the haze is reduced by at least 5%, preferably by at least 10%, more preferably by at least 15%, even more preferably by at least 25%, and most preferably by at least 35%.

According to still another aspect the present invention is directed to the use of a zinc fatty acid salt, preferably zinc stearate, in a process as defined above to form an article, like a molded article, having reduced haze relative to the same article formed in the absence of said zinc fatty acid salt, preferably in the absence of said zinc stearate wherein haze is measured according to ASTM D 1003-07 on 60×60 mm² plaques having thickness of 2 mm prepared according to EN ISO 1873-2 at a processing temperature of the plaques of 190° C. Preferably the haze is reduced by at least 5%, preferably by at least 10%, more preferably by at least 15%, even more preferably by at least 25%, and most preferably by at least 35%.

According to still yet another aspect the present invention is directed to the use of a zinc fatty acid salt, preferably zinc stearate, as a component in a polymer composition as defined herein, to reduced haze relative to the same polymer composition but in the absence of said zinc fatty acid salt, preferably in the absence of said zinc stearate, wherein haze is measured according to ASTM D 1003-07 on 60×60 mm² plaques having thickness of 2 mm prepared according to EN ISO 1873-2 at a processing temperature of the plaques of 190° C.

EXAMPLES

1. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C$ {$^1H$} NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio-defects:

$$P_{total}=P_{12}+P_{21e}$$

The mole percent of 2,1-erythro regio-defects was quantified with respect to all propene:

$$[21e] \text{ mol.-}\%=100*(P_{21e}/P_{total})$$

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C$ {$^1H$} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

Melting temperature ($T_m$) and crystallization temperature ($T_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Melting temperature and crystallization temperature is determined from the second heating step.

$MFR_2$ (230° C.) is measured according to ISO 1133 (230° C., 2.16 kg load).

Haze is determined at a temperature of 190 C.° according to ASTM D 1003-07 on 60×60 mm² plaques with a thickness of 2 mm prepared according to EN ISO 1873-2.

Yellowness Index is determined according to ASTM E313.

2. Examples

Preparation of the Random Propylene Ethylene Copolymer (R-PP)

The catalyst used in the polymerization processes of the examples was the catalyst as prepared in Example 8 of WO 2004/029112A1 (see pages 22-23), except that diethylaluminium chloride was used as an aluminium compound instead of triethylaluminium. An external donor, dicyclopentyldimethoxy silane, has been used. The ratio of aluminium to donor was 7.5.

TABLE 1

Preparation of the random propylene ethylene copolymer (R-PP)

| | | R-PP |
|---|---|---|
| Prepoly | | |
| Residence time | [h] | 0.6 |
| Temperature | [° C.] | 30 |
| Donor/C3 | [g/ton] | 50 |
| Teal/C3 | [g/ton] | 160 |
| Loop (R1) | | |
| Residence time | [h] | 0.77 |
| Temperature | [° C.] | 70 |
| $H_2/C_3$ ratio | [mol/kmol] | 10 |
| $C_2/C_3$ ratio | [mol/kmol] | 1.45 |
| MFR | [g/10 min] | 30 |
| XCS | [wt %] | 6.0 |
| C2 content | [mol %] | 4.1 |
| split | [wt %] | 45 |
| $1^{st}$ GPR (R2) | | |
| Residence time | [h] | 2.1 |
| Temperature | [° C.] | 82 |
| Pressure | [kPa] | 20 |
| $H_2/C_3$ ratio | [mol/kmol] | 133 |
| $C_2/C_3$ ratio | [mol/kmol] | 30 |
| MFR | [g/10 min] | 30 |
| XCS | [wt %] | 6.0 |
| C2 content | [mol %] | 5.0 |
| split | [wt %] | 55 |

The samples were obtained by melt mixing the random propylene copolymer (PP) with the additives indicated in table 2 with the extruder Coperion 18 extruder at a temperature of 225° C.

TABLE 2

Polymer composition

| | | CE1 | CE1 | IE1 | 1E2 |
|---|---|---|---|---|---|
| R-PP | [wt %] | 99.4999 | 99.5494 | 99.5021 | 99.5549 |
| Irganox 1010 | [wt %] | 0.0315 | 0.0330 | 0.0303 | 0.0315 |
| Irgafos 168 | [wt %] | 0.0630 | 0.0650 | 0.0650 | 0.0630 |
| GMS/GDS | [wt %] | 0.1415 | 0 | 0 | 0 |
| GMS | [wt %] | 0 | 0.1000 | 0.1000 | 0.1000 |
| DMDBS | [wt %] | 0.1695 | 0.2000 | 0.2000 | 0.2000 |
| Ca stearate | [wt %] | 0.0945 | 0.0520 | 0.0520 | 0 |
| Zn stearate | [wt %] | 0 | 0 | 0.0500 | 0.0500 |
| Tinopal | [wt %] | 0.0001 | 0.0006 | 0.0006 | 0.0006 |

Irganox 1010 is tetrakis-(methylene-(3,5-di-(tert)-butyl-4-hydrocinnamate))methane (CAS 6683-19-8);
Irgafos 168 is tris(2,4-di-(tert)-butylphenyl)phosphate (CAS 31570-04-4);
GMS is glyceryl monostearate commercially available
GDS is glyceryl distearate commercially available.
DMDBS is 1,3:2,4 bis(3,4-dimethylbenzylidene)sorbitol (CAS-no. 135861-56-2), commercially available as Millad 3988 of Milliken;
Ca stearate commercially available as Calcium Stearate, Pure, from Nimbasia
Zinc stearate commercially available as Zinc Stearate, Pure, from Nimbasia;
Tinopal is 2,5-bis(5-tert-butylbenzoxazol-2-yl)thiophene (CAS-no. 7128-64-5) commercially available from BASF The haze and the yellowness of the examples were determined from 60×60 mm² injection molded plaques with a thickness of 2 mm prepared according to ASTM D1003. The injection molding temperatures are indicated in tables 3 and 4.

TABLE 3

Haze

| | CE1 | CE2 | IE1 | IE2 |
|---|---|---|---|---|
| Haze (190° C.) [%] | 60.6 | 49.3 | 33.8 | 26.6 |
| Haze (200° C.) [%] | 35.2 | 35.3 | 28.1 | 27.4 |

TABLE 4

Yellowness Index

| | | CE1 | IE1 | IE2 |
|---|---|---|---|---|
| Yellowness Index (190° C.) | [—] | 6.0 | −0.5 | −0.3 |
| Yellowness Index (200° C.) | [—] | 6.2 | −0.1 | −0.6 |

The invention claimed is:

1. Polymer composition, comprising:
    (i) polypropylene (PP),
    (ii) 0.03 to 0.2 wt % of a first nucleating agent (NU1) which is 1,3:2,4 bis(3,4-dimethylbenzylidene)sorbitol, and
    (iii) 0.04 to 0.06 wt % of a zinc fatty acid salt,
    wherein the first nucleating agent (NU1) and the zinc fatty acid salt, together fulfill the inequality (If):

$$5 \geq \frac{W(NU_1)}{W(EAF)} \geq 0.5 \quad \text{(If)}$$

wherein "W (NU1)" is the weight [wt %] of the first nucleating agent (NU1), based on the weight of the polymer composition and "W (EAF)" is the weight [wt %] of the zinc fatty acid salt, based on the weight of the polymer composition; and wherein the polymer composition comprises an optical brightener (OB), the optical brightener is selected from the group consisting of 5-methyl-2,2'-(vinylenedi-p-phenylene)bis-benzoxazole, 2,2'-(4,4'-diphenol vinyl)dibenzoxazole, 2,5-bis(5-tert-butylbenzooxazol-2-yl)thiophene, 1,4-bis(2-benzoxazolyl)naphthalene, and 2-(5-chlorobenzo[d]oxazol-2-yl)acetonitrile.

2. Polymer composition according to claim 1, wherein the polymer composition:
    (a) does not contain calcium stearate, and/or
    (b) comprises a second nucleating agent (NU2).

3. Polymer composition according to claim 1 comprising:
    (i) the polypropylene (PP) in an amount of more than 95.0 wt % based on the weight of the polymer composition,
    (iv) optionally a second nucleating agent (NU2) in an amount of equal or below 1.0 wt %, based on the weight of the polymer composition, and
    (v) the optical brightener (OB) in an amount of equal or below 0.100 wt %, based on the weight of the polymer composition.

4. Polymer composition according to claim 1, wherein the polypropylene (PP):
    (a) is a propylene copolymer comprising equal to or below 5 wt % comonomer, wherein the comonomer is selected from ethylene and/or one or more $C_4$-$C_8$ α-olefins, and/or
    (b) is monophasic.

5. Polymer composition according to claim 1, further comprising alkali earth fatty acid salt, wherein the weight ratio between the zinc fatty acid salt, and the alkali earth fatty acid salt, is 20/80 to 80/20.

6. Polymer composition according to claim 3, obtained from melt-blending at a temperature in the range of 110 to 140° C., the polypropylene (PP) with the first nucleating agent (NU1), the zinc fatty acid salt, optionally an alkali earth fatty acid salt, optionally the second nucleating agent (NU2) and the optical brightener (OB).

7. Polymer composition according to claim 1, having:
(a) a haze in the range from 20 to 40%, wherein the haze is measured according to ASTM D 1003-07 on 60×60 mm² plaques thickness of 2 mm prepared according to EN ISO 1873-2 at a processing temperature of the plaques of 190° C., and/or
(b) yellowness index in the range of −20 to 15, as determined according to ASTM E313.

8. Molded article comprising a polymer composition according to claim 1.

9. Molded article according to claim 8, wherein the article is an injection molded article, blow molded article, a co-injection-gas assisted molding article, a structural foam molding article, an extrusion blow molding article, an injection blow molding article or an injection stretch molding article.

10. Molded article according to claim 8, wherein the article has a thickness from 0.3 to 5.0 mm.

* * * * *